Sept. 11, 1928.  
F. J. SEWALL  
1,683,733  
EDUCATIONAL DEVICE  
Filed March 1, 1928
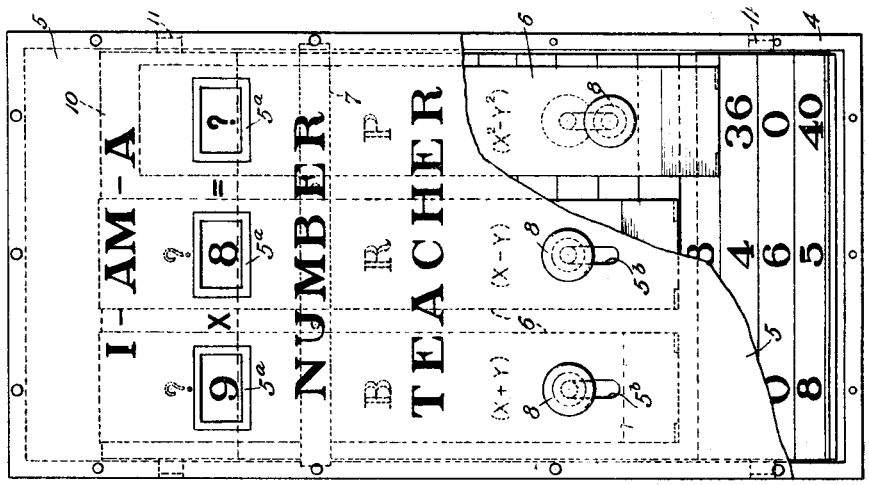
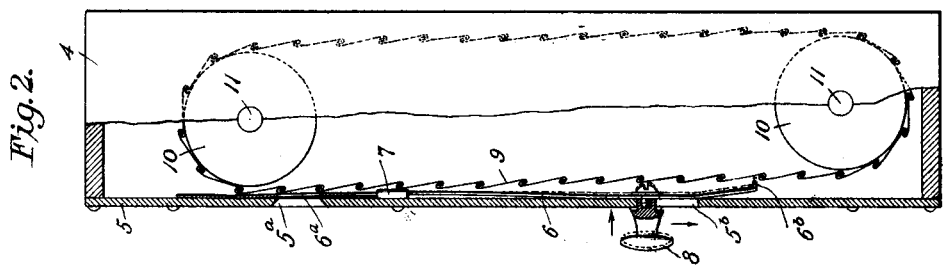
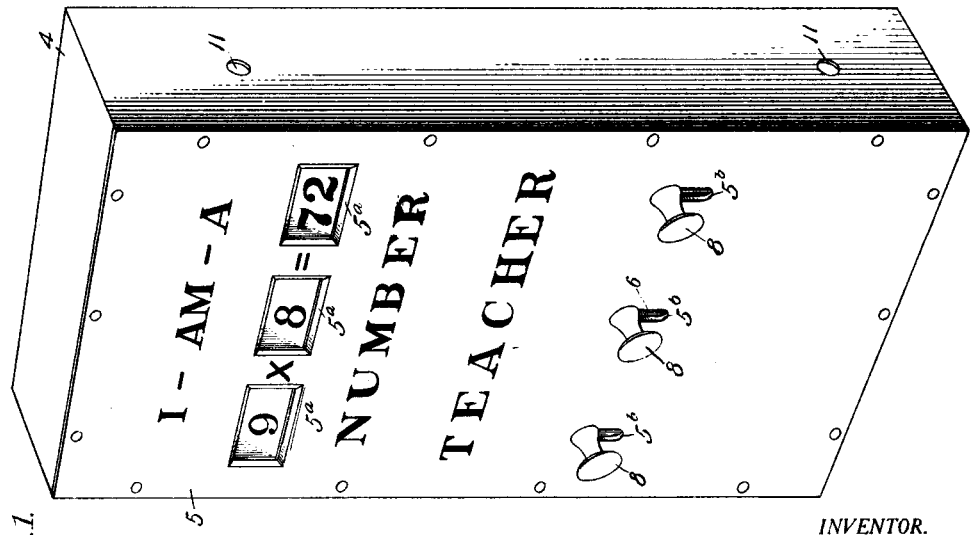
INVENTOR.  
F. Judson Sewall.  
BY Dowell & Dowell  
ATTORNEYS.

Patented Sept. 11, 1928.

1,683,733

UNITED STATES PATENT OFFICE.

FRANK JUDSON SEWALL, OF COLUMBIANA, OHIO.

EDUCATIONAL DEVICE.

Application filed March 1, 1928. Serial No. 258,420.

This invention relates to educational devices and aims to provide means of improved character and construction for use in aid of teaching and especially in teaching the fundamentals of mathematics in the elementary branches.

The invention will be best understood upon description with reference to the appended drawings, wherein a constructional embodiment thereof is illustrated.

In said drawings:

Fig. 1 is a perspective view of one form of the device showing how a mathematical equation is thereby presented to view for instructive purposes;

Fig. 2 is a side elevation of the device shown partly in section to disclose its interior construction; and Fig. 3 is a front elevation of the device with cover broken partly away and revealing one of the operable parts moved to position concealing a factor of the equation from view.

In the illustrative construction, the device embodies a container 4 of rectangular form having a front panel or cover 5 removably secured thereto. Said panel is formed with window-openings $5^a$ in number and relation corresponding with the factors of problematical equations to be presented to view for instructive purposes. In this instance only three of such openings are shown adapting the device to presentation of simple problems or equations of three factors, said openings being disposed in alinement across the upper end of the panel.

The panel also bears appropriate indicia including symbols or signs between the window-openings therein to indicate the mathematical relation of the equation factors to appear within said openings. In this instance the multiplication symbol "×" appears between the first and second openings while the equality symbol "=" appears between the second and third openings, thus providing for a simple example in multiplication. When examples in division, subtraction, addition, percentage, etc. are to be given, the symbols between the window-openings are appropriately changed, while equations of a greater number of factors are provided for by increasing the number of said openings.

Behind the window-openings in the panel, separate closure slides 6 are shown movable independently under a common brace 7 by means of attached knobs 8 extending outwardly through guide-slots $5^b$ in the lower end of the panel. Said slides are formed at their upper ends with openings $6^a$ adapted to register with said window-openings when in raised position, while their lower ends bending gradually away from the panel are each given a flange to provide an edge $6^b$ adapted to function similarly to the pawl of a ratchet-mechanism as will hereinafter appear. Above said openings in the upper ends of the slides, interrogatory marks are applied to appear in the window-openings of the panel when the slides are in lowered position. Accordingly, when all the slides are closed, the indicia appearing in and between the window-openings will read "? × ? = ?" across the panel.

Means for bringing desired indicia opposite the openings in the panel are provided by an endless travelling-member 9 shown under tension supported over rollers 10, the latter being idly rotatable on pintles or shafts 11 journaled in the walls of the container at opposite ends thereof. In this instance said member comprises a plurality of metallic slats or strips hinged or flexibly connected together longitudinally by inter-engaging oppositely turned edges, thereby forming an endless shutter-like structure presenting equi-spaced transverse ledges or shoulders which may be engaged by the lower ends of the aforesaid slides in the manner of a ratchet mechanism, for advancing the member over its rollers.

Indicia of desired character or value is applied to the slats of said member in such relation as to appear within the openings in the panel as the member is advanced with its slats consecutively opposing said openings to thereby present a series of accurate equations or problems for instructive purposes. For example, the slat opposing the openings in the illustrative device bears the figures "9 8 72" spaced to appear respectively in the first, second and third openings in mathematical relation to the symbols therebetween and accordingly present the equation "9 × 8 = 72."

Each of the slats bears indicia presenting an example or equation different from the others. Some may bear indicia presenting equations in algebra, factoring, percentage, etc., such as "$(X\ Y)\ (X-Y)\ (X^2-Y^2)$" and "B R P" as indicated in dotted lines in Fig. 3. When brought opposite the openings in the panel, the indicia of the above two examples will read "$(X Y) \times (X-Y) = X^2 - Y^2$" and "$B \times R = P$" (said letters respectively standing for base, rate and principal).

If the device is used for teaching spelling, the symbols between the openings are omitted and the slats then bear letters spelling out different words such as "Cat", "Rat" and "Dog". When desired to present equations (or words) of a greater number of factors (or letters), the number of the panel openings, closure sides therefor and indicia units (figures or letters) carried by the slats to underlie the openings are increased accordingly.

The device is operated in a very simple manner. Let it be assumed that all three of the slides 6 are in lowered position, while the slat of the travelling-member 9 bearing the figures "9 8 72" opposes the window-openings 5ª in the panel. As hereinbefore stated, the indicia in and between said openings will accordingly read "$? \times ? = ?$". If the slides over the first and second of the openings are then raised by their knobs 8, in which position they normally remain under friction, the indicia in and between said openings will read "$9 \times 8 = ?$". Similarly, if the slides over the first and third, or over the second and third are raised and the remaining one is left in lowered position, the indicia in and between the window-openings will read respectively "$9 \times ? = 72$" and "$? \times 8 = 72$". The slides may be operated freely up and down to open and close the window-openings and accordingly make visible or conceal the figures therewithin, whereby the same equation may be presented in several different ways or problems for instructive purposes.

In order to advance the travelling-member and bring a successive slat opposite the window-openings, either of the closure slides is moved downwardly with simultaneous inward pressure, causing its lower or pawl-like end to engage against the underlying ledge or shoulder of a slat at the lower end of the travelling-member and consequently push it downwardly, thereby advancing the member over its rollers for the extent of one slat, the breadth of the slats and the length of the slots 5ª in the panel being substantially equal. Thus, the travelling-member may be moved by one or all of the slides to bring a successive one of its indicia-bearing slats opposite the openings in the panel, and the slides may be moved up and down freely without advancing the travelling-member until one of them is again pressed inwardly during downward movement so as to engage against the longitudinal edge of a slat at the lower end of said member.

The novelty and utility of the device adapted to operation in the manner described for presenting a series of mathematical equations or words for instructive purposes, will be readily appreciated.

As the device may be constructed in various ways and numerous modifications thereof may be made without departing from the spirit and scope of the invention, it is not intended that it shall be limited by the appended claims to the specific construction shown and described.

Having thus described my invention, what I claim as new and desire to secure by Letters Patent of the United States is:

1. A teaching device comprising a container having a side formed with window-openings and bearing indicia including mathematical symbols betwen said openings; idling rollers in opposite ends of the container; an endless travelling-member supported on said rollers and embodying a plurality of slats hinged together and bearing indicia visible through said openings as they are moved opposite thereto; and slides movably disposed between said openings and said travelling-member, having openings near their upper ends registerable with the aforesaid openings in the container side when in raised position and flanges at their lower ends providing pawl-like portions engageable with parts of the travelling-member during sliding movement in one direction for advancing said member a predetermined extent over said rollers.

2. A teaching device comprising a container having a side formed with window-openings and bearing indicia including mathematical symbols between said openings; idling rollers supported in opposite ends of the container; an endless travelling-member under tension mounted over said rollers and embodying a plurality of slats hinged together longitudinally and bearing indicia visible through said openings as they are moved opposite thereto; slides movable selectively between said openings and said travelling-member, having openings near their upper ends registerable with the aforesaid openings in the container side when in raised position and flanges at their lower ends providing pawl-like portions engageable with projecting edges of the slats of the travelling-member during lowering movement for advancing said member over said rollers a predetermined extent; and guides in which said slides are operatively movable.

3. A teaching device comprising a container having a side formed with window-openings and bearing indicia including mathematical symbols between said openings; idling rollers journaled in opposite ends of the container; an endless travelling member under tension supported on said rollers and embodying a plurality of slats connected together longitudinally by inter-engaging oppositely turned edges and bearing indicia visible through said openings as they are moved consecutively opposite thereto; slides movable selectively between said openings and said travelling-member, having openings near their upper ends registerable with the aforesaid openings in the container side when in raised position and flanges at their lower ends providing pawl-like portions engageable with edges of the slats of the travelling-member during downward movement for advancing said member over said rollers a predetermined extent; guides in which said slides are frictionally movable; and means for independently operating said slides.

In testimony whereof I affix my signature.

FRANK JUDSON SEWALL.